United States Patent [19]

Ford et al.

[11] Patent Number: 5,500,989
[45] Date of Patent: Mar. 26, 1996

[54] SLIDING CHIP GUARD FOR A BRAKE LATHE

[75] Inventors: James D. Ford, Franklin, Tenn.; Larry C. Tuck, Franklin, Ky.

[73] Assignee: Hennessy Industries, Inc., Lavergne, Tenn.

[21] Appl. No.: 415,195

[22] Filed: Apr. 3, 1995

[51] Int. Cl.$^6$ .......................... B23Q 11/08; B23B 25/04
[52] U.S. Cl. .................. 29/27 R; 29/DIG. 56; 29/DIG. 59; 82/112; 82/152; 409/1; 451/435; 451/451
[58] Field of Search .................. 29/27 R, 27 C, 29/DIG. 94, DIG. 56, DIG. 59; 409/134; 142/1, 55; 82/901, 173, 152; 408/710; 451/435, 451; 74/608

[56] References Cited

U.S. PATENT DOCUMENTS

| | | | |
|---|---|---|---|
| 4,058,937 | 11/1977 | Mitchell | 451/435 |
| 5,018,228 | 5/1991 | Bogaerts et al. | 451/435 |
| 5,359,913 | 11/1994 | Kimmell | 29/DIG. 56 |

Primary Examiner—William Briggs
Attorney, Agent, or Firm—Waddey & Patterson; I. C. Waddey, Jr.

[57] ABSTRACT

Applicants' invention is an enhanced chip guard assembly particularly adapted to be used in conjunction with a vehicular brake lathe having a tubular slide cross-feed with an integral dove tail mount for longitudinal feed. The enhanced chip guard assembly of the present invention includes a clip that fits within an opening in the cross feed assembly of the machine, a slide that fits over the clip, and a follower that fits about the neck of the drum feed guide arm and rides on the slide.

5 Claims, 14 Drawing Sheets

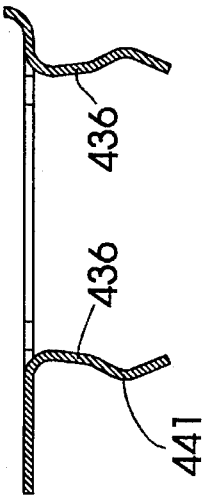
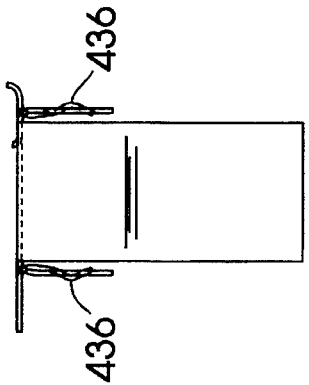
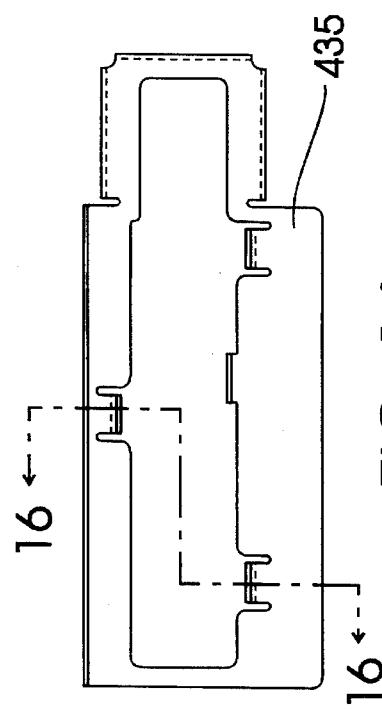
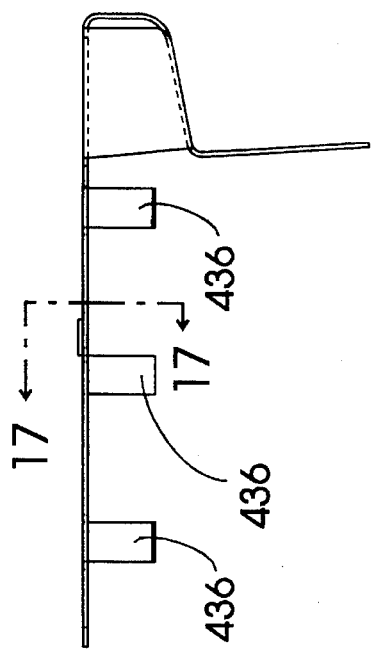

SLIDING CHIP GUARD FOR A BRAKE LATHE

BACKGROUND OF THE INVENTION

The present invention relates generally to brake lathes and particularly to a brake lathe that can finish the wear surface of both brake disks and brake drums of vehicular breaking systems. More specifically, the present invention is an enhanced sliding chip guard for brake lathes that simplifies the guard structure, eliminates the need for fasteners for the guard, is easy to manufacture and assemble, and has no moving parts that are subject to wear as is problematic with known prior art systems.

It will be appreciated by those skilled in the art that braking systems for cars, trucks, buses, and the like (all referred to herein generally as "vehicles"), are subject to tremendous heat and pressure, and in the life of a vehicular braking system, pads are activated against drums and rotors thousands if not millions of times. In the design of vehicles, it is a design objective to reduce weight, particularly in functional items such as braking systems, which means that size and material specifications are constantly decreasing the thickness, weight and strength of vehicular braking parts. With these designs, brake system rotors become worn over time to form grooves in the wear surface which results in a loss of braking capacity. Other wear problems include "run-out" ("run-out" describing intermittent wear on a rotor about its perimeter) which causes brake pulsation; or the system may experience rotor warp which is a warp or bending of the rotor so that the rotor is not planer in shape, thus causing an uneven contact by the brake pads on the rotor. Rotor warp impairs the ability of the pads to apply consistent pressure to the rotor, thereby generating heat and ultimately leading to further destruction of the braking system.

In drum type systems, the drum is subject to pressures which may cause it to wear slightly out of round and become egg shaped, thereby reducing the effectiveness of the pressure of the pads against the drum. Uneven cross sectional wear of the pad on the drum can cause the face of the drum to become tapered or bell-mouthed, the consequence of either variety of uneven wear resulting in a poor contact between the brake pad and the drum and thereby generating greater heat and ultimately the destruction of the pads. These problems cause the braking system to become less and less effective until it deteriorates and has to be replaced completely.

All of these problems are well known in the art and are generally addressed by a resurfacing of the rotors and drums of braking systems through a process which is referred to in the industry as "turning". Turning the rotor of a disk brake system or the drum of a drum brake system is a reference to a refinishing of the wear surface of the element so that, with respect to a rotor, the surface is in a substantially perfect plane about the outer perimeter of the rotor, and with respect to a brake drum, the wear surface is round and flat to mate perfectly with the shoes which force the brake pad against the drum.

Brake lathes have been available for many years to turn brake rotors and brake drums. However, Applicant' have recognized the need for improvement of existing brake lathes. Brake lathes currently available on the market are large, cumbersome to operate and have many working parts that are subject themselves to wear, destruction and need for replacement.

Another problem associated with all brake lathes arises out of the metal shavings created by the brake lathe when rotors and drums are turned. The shavings tend to fail into the working parts of the lathe and can, over a period of time, build up to substantial waste and cause damage to the machine. Prior art efforts to solve this problem include chip guards constructed of springs surrounded by material or cloth; flexible covers attached to the machine on one end and counter weighted on the other end; accordion style covers; or metal covers attached by additional fasteners. These prior art systems have a number of disadvantages, including the cost to manufacture, the difficulty and time involved in assembly and replacement, and the need for fasteners that tend to work loose during operation of the machine Therefore, there is a need, presently untilled in the prior art, for a better guard for protecting the machine from shavings created by and during operation.

What is needed then is a brake lathe machine that is relatively simple to manufacture and assemble; that has fewer working parts; that is sturdy and structurally stable through repeated uses with a minimum of size and bulk; that protects its working parts against debris and that is compact, efficient, and easy to operate.

SUMMARY OF THE INVENTION

Applicant' invention is particularly adapted to be used in conjunction with a vehicular brake lathe having a tubular slide cross-feed with an integral dove tail mount for longitudinal feed. The enhanced chip guard assembly of the present invention includes a clip that fits within an opening in the cross feed assembly of the machine, a slide that fits over the clip, and a follower that fits about the neck of the drum feed guide arm and rides on the slide.

BRIEF DESCRIPTION OF THE DRAWINGS

FIG. 14 illustrates a top view of the clip of the present invention.

FIG. 15 illustrates a side view of the clip of the present invention.

FIG. 16 illustrates a cross sectional view of the clip of the present invention taken along the bold line shown in the gap of the top view of FIG. 14.

FIG. 17 illustrates a cross sectional view of the upturned guide lip of the clip of the present invention.

FIG. 18 illustrates a front view of the clip of the present invention.

DESCRIPTION OF THE PREFERRED EMBODIMENT

Figure 1:
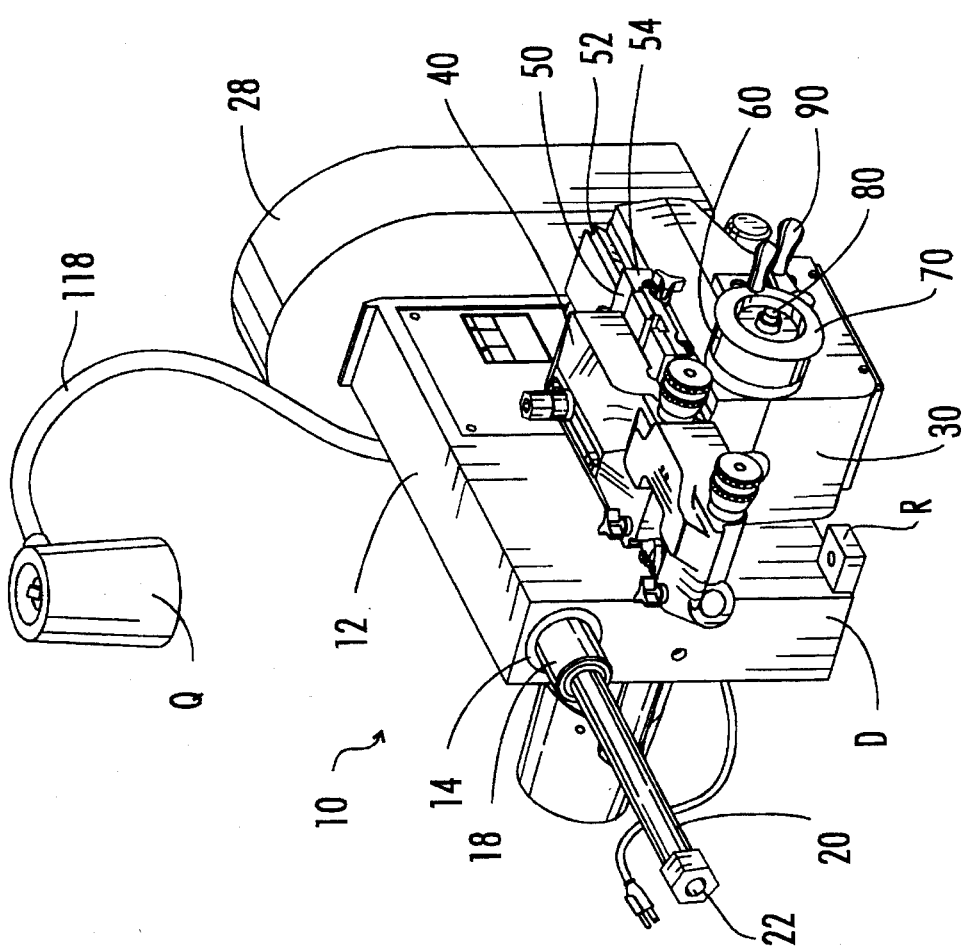
FIG. 1 shows a perspective view of the assembled brake lathe machine.

The preferred embodiment of the brake lathe machine 10 for which this invention is particularly adaptable is shown generally in FIG. 1. As can be seen from FIG. 1, the machine 10 includes a mainframe 12 having a longitudinal opening 14 and a lateral opening 16 (see FIG. 4). A spindle 18 passes through the mainframe through the longitudinal opening 14. An arbor 20, by which a brake rotor or brake drum can be mounted onto the machine 10, is connected to and projects from the end of the spindle 18. An arbor nut 22 is engaged on the end of the arbor 20 to hold the rotor or drum clamping assembly on the spindle.

A cross-feed assembly 30 includes a cross-feed journal 34 (FIG. 5) which mounts within the lateral opening 16. The cross-feed journal 34 provides a stable mounting of the cross-feed assembly 30 to the mainframe 12 and permits the cross-feed assembly 30 to traverse the machine 10 during operation of the lathe to turn a brake rotor.

A power drive motor 26 (see FIG. 4) is mounted on the back side of the machine 10 when viewed in the manner illustrated in FIG. 1. The power drive motor 26 is mounted such that the shaft of the motor is substantially parallel to the axis of the spindle 20. The power drive motor 26 provides power, through a drive belt assembly hereinafter described, to turn the spindle. A brake rotor or brake drum mounted on the spindle can thus be rotated at a high speed about its axis. The cutting tool of the brake lathe is then placed into engagement with the turning brake rotor or brake drum. The cutting tool will be gauged to make a minuscule scoring of the brake part and the surface of the part is then finished by moving the curing tool by the mechanisms hereinafter described either laterally (to finish the wear surface of a brake rotor) or longitudinally (to finish the wear surface of a brake drum). Also shown in FIG. 1 is the drive belt assembly cover 28 which covers the drive belt assembly that transfers the power from the power drive motor 26 to the spindle 20.

Figure 12:
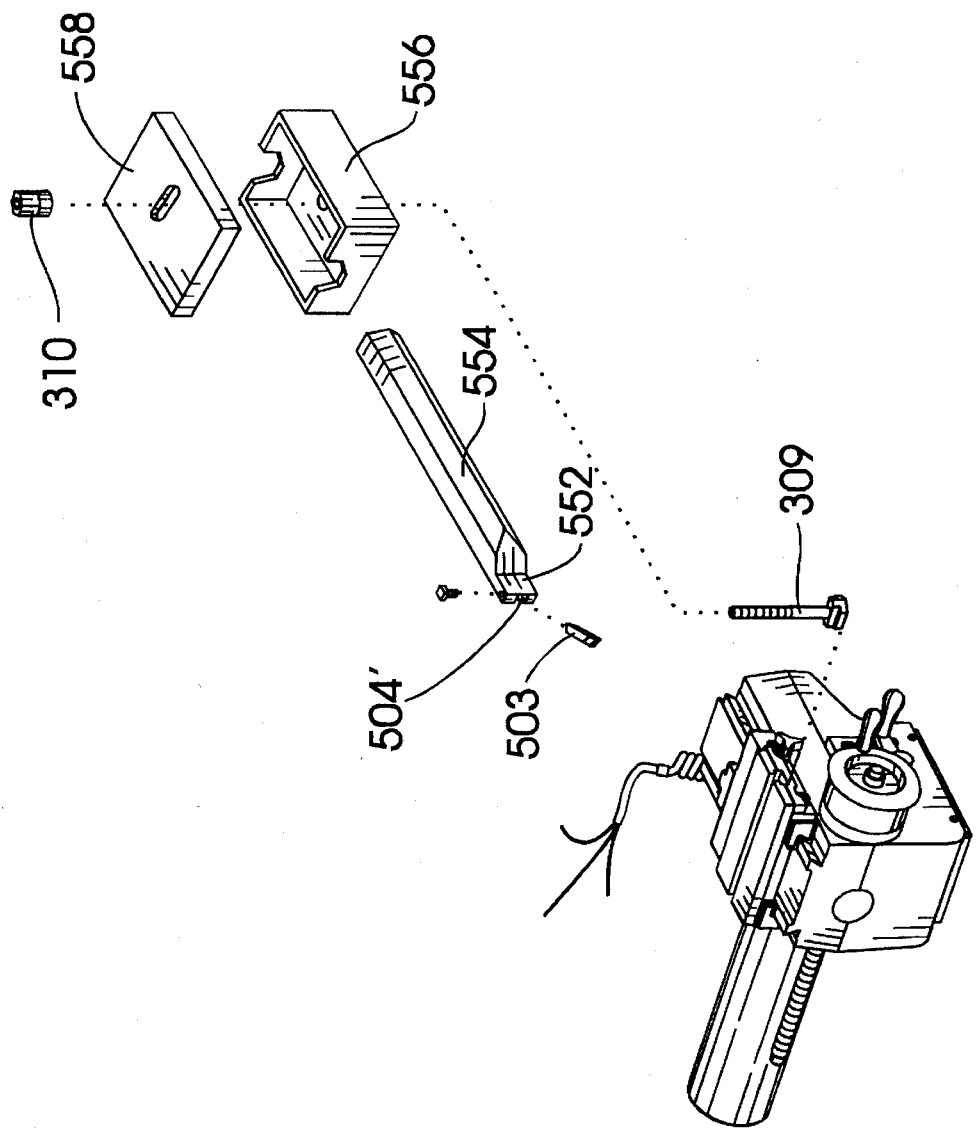
FIG. 12 shows a perspective view of the boring bar assembly as it would mount on the dove tail mounting assembly.

Twin cutter 40 is mounted on the dove-tail mounting assembly 50 which is mounted, in turn, on the cross feed assembly 30. The dove-tail mounting assembly 50 includes a rail 52 formed in the top of the housing of the cross feed assembly 30; rail 52 extending in a longitudinal direction relative to the mainframe 12 and having a dove-tail shaped cross-section; and a slide 54 which has an elongated mouth along its underside shaped to mate with the rail 52 and fit in slidable engagement with it. With this dove tail mounting assembly, when the twin cutter is mounted on the machine to make a lateral cut to finish a brake rotor, the cutter is stable against waggle, yet the twin cutter 40 can be replaced with a boring bar assembly (see FIG. 12), and the boring bar assembly can move longitudinally of the machine 10 along the rail 52 so that the cutting tool carried by the boring bar assembly can finish the wear surface of a brake drum.

FIG. 1 also illustrates generally the feed mechanism hand wheel 70, the structure of which includes a depth of cut dial 60 and a feed button 80 for selective positioning to determine whether the feed of the cutting tool is lateral or inline. Finally, FIG. 1 illustrates generally the feed engagement lever 90 which must be activated in order to engage the slide drive power shaft of the drive train of the slide drive mechanism in order to drive the lead screw to which the power shaft has been engaged for either lateral or inline travel of the cutting tool.

Figure 2:
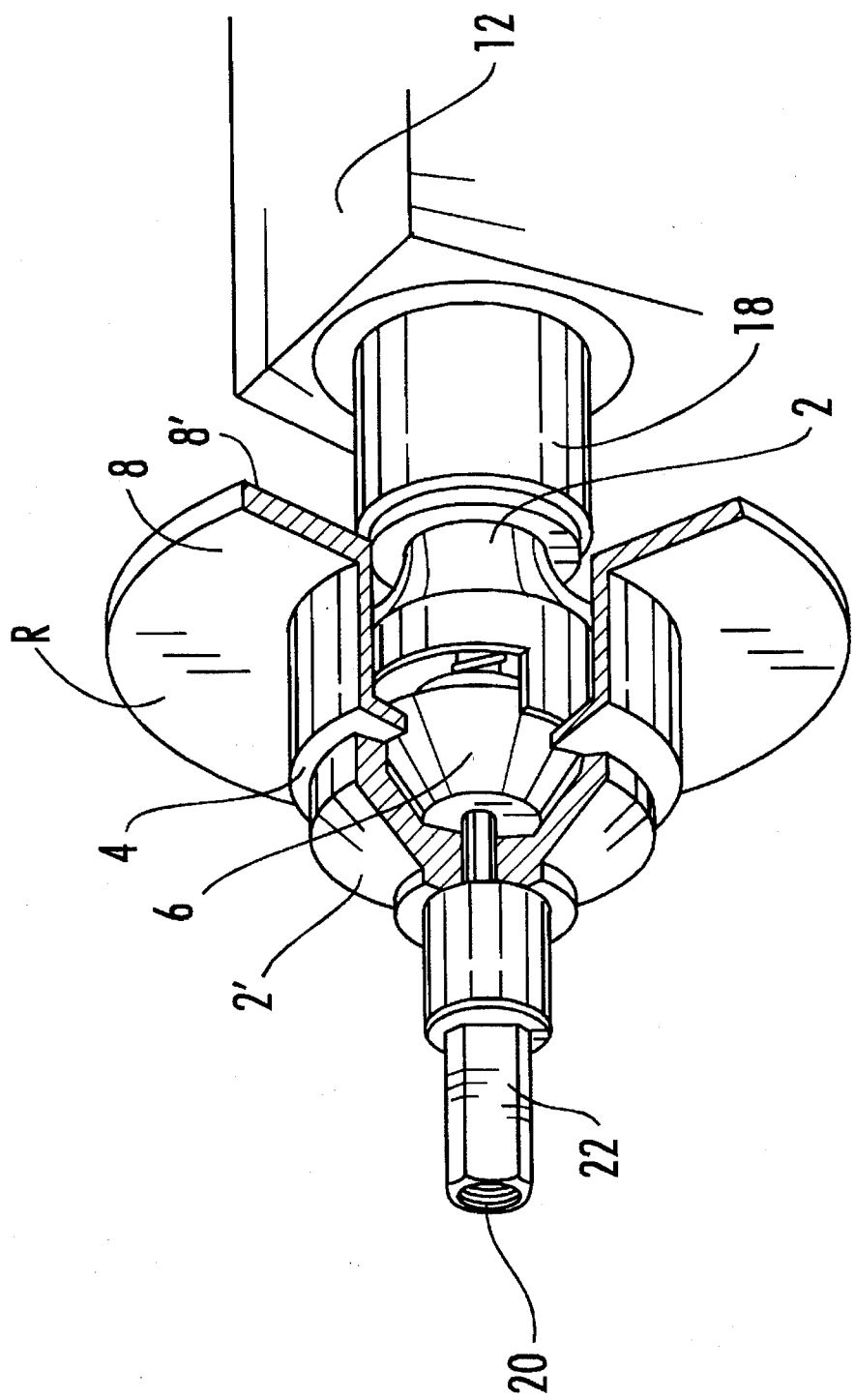
FIG. 2 shows a perspective view of the rotor of a disk brake system mounted on the spindle of the machine.

Referring now to FIG. 2, the mounting of a brake rotor R onto the spindle 18 is schematically illustrated. As can be seen from FIG. 2, spindle 18 extends from the mainframe 12 of the machine 10 and arbor 20 extends from the spindle 18. Mounted on the spindle 18 is a small hubless adapter 2 and a large hubless adaptor 2'. Sandwiches between the two hubless adapters 2, 2' is the mounting flange 4 of the rotor R. The mounting flange 4 of the rotor R is seated against a centering cone 6 which is mounted on the arbor 20 against the small hubless adaptor 2. Mounting flange 4 is captured between the centering cone 6 and the large hubless adaptor 2' to properly position the rotor R once the arbor nut 22 is tightened against the arbor 20. Thus, the rotor R is securely captured on the end of the spindle and as the spindle turns, so will the rotor, enabling the cutting tool to finish the wear surface of the rotor in the manner hereinafter described.

For purposes of this description, it is understood that the wear surfaces of the rotor are the outer perimeter of the two opposing faces 8 and 8' of the rotor shown in FIG. 2. To finish the wear surfaces of the rotor, it is necessary to place the two facing cutting tools of the twin cutter assembly 40 in contact with opposing faces 8,8' at a point radially inwardly from the outermost perimeter of the rotor R and then, as the rotor turns, advance the twin cutter assembly 40 radially away from the hub of the rotor so that the faces 8,8' are finished by engagement therewith by the two facing cutting tools as the twin cutter assembly moves to a point at the outward most extreme position of the rotor.

Figure 3:
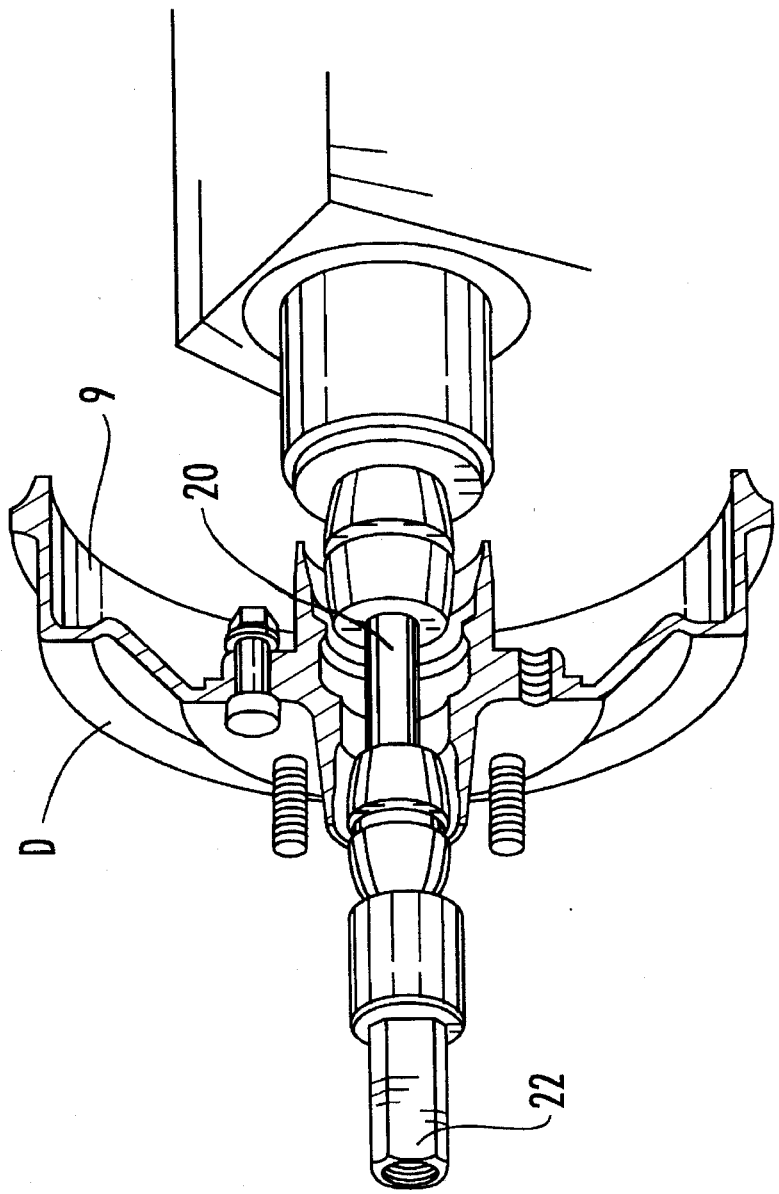
FIG. 3 shows in a perspective view of the brake drum of a brake drum system mounted on the spindle of the machine.

Referring now to FIG. 3, the mounting assembly for a brake drum D is shown to be similar to the mounting of the brake rotor R. However, the surface that must be finished on the brake drum D is the arcuate surface 9 inside the drum D. The arcuate surface 9 is engaged by pads (not shown) on the brake shoes (not shown) which face the arcuate surface 9. When the brake pedal is depressed, a hydraulic piston is expanded, forcing the brake shoes to expand and cause the braking process by the frictional engagement between the pads mounted on the shoes and the arcuate surface 9. Thus, the arcuate surface 9 is the wear surface of brake drum system and must periodically be finished in order to maintain the efficiency of the system. However, as can be seen from FIG. 3, the tangential plane of the arcuate surface 9, when the drum D is mounted on the spindle 18, is substantially perpendicular to the plane of the wear surface of the brake rotor R. Thus, the movement of the cutting tool must be in an axial direction relative to the spindle in order to finish the wear surface 9 of the drum D, as opposed to a radial movement in relationship to the spindle 18 when finishing the wear surfaces 8, 8' of a rotor R. Turning a drum is accomplished by removing the twin cutter assembly 40 and replacing it with a boring bar assembly of the type illustrated in FIG. 12. The boring bar assembly has a bar holding a cutting tool in a position to engage surface 9 of a drum D so that in line movement of the cutting tool will finish the arcuate surface 9.

Figure 4:
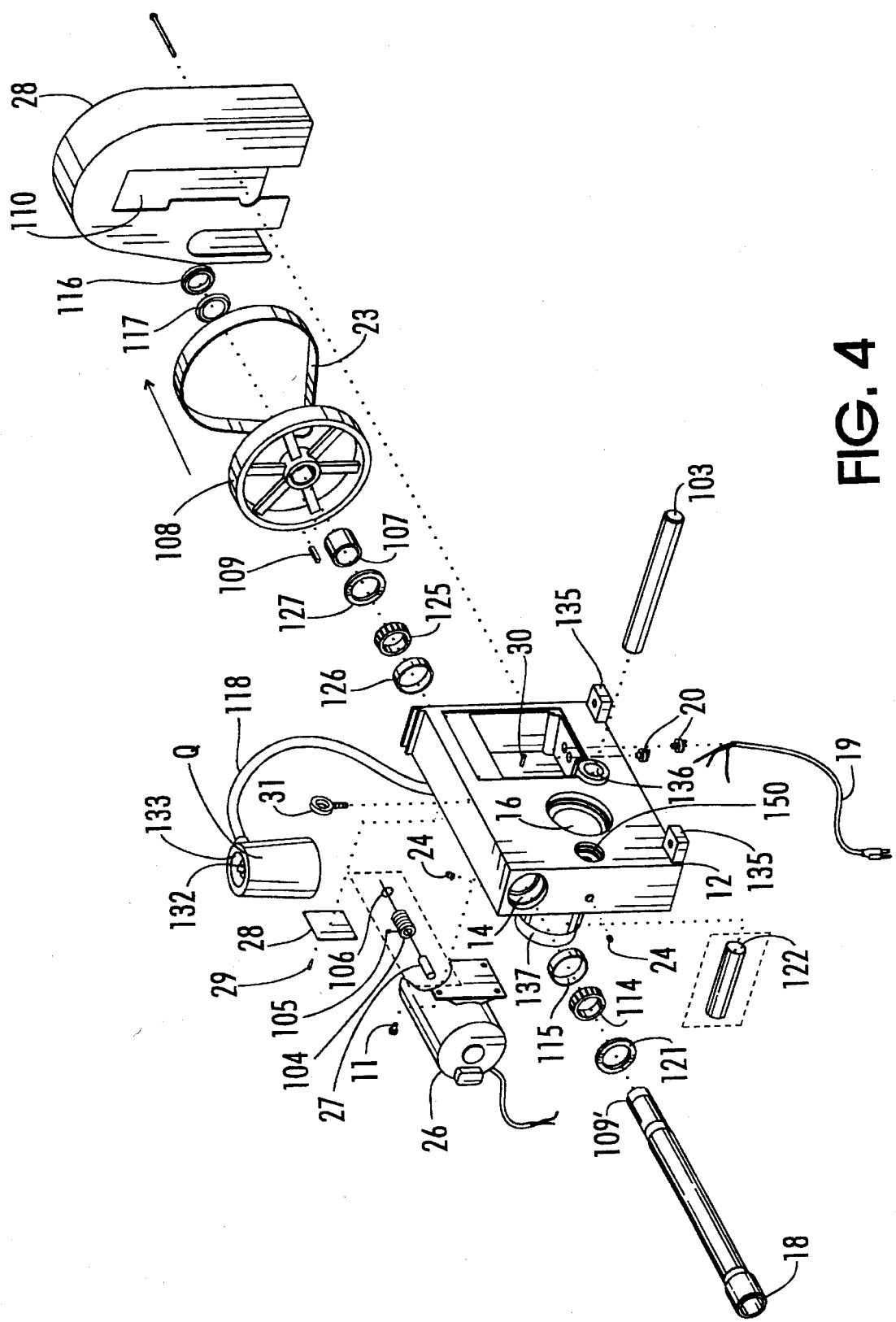
FIG. 4 illustrates in exploded perspective view the mainframe assembly of the machine.

Looking now at FIG. 4, the mainframe assembly is illustrated in detail, showing the mainframe 12 with longitudinal opening 14 and lateral opening 16. Spindle 18 passes through the longitudinal opening 14. The spindle 18 is mounted in a bearing cone 114 within a bearing cup 115 and a seal 121 on the proximal end of the machine. A similar beating cone 125 within a beating cup 126 sealed by seal 127 is provided on the distal end of the spindle 18.

Mounted on the distal end of the spindle 18 as it extends through the mainframe 12 is a spacer 107 spacing the spindle sheave 108 from the mainframe 12. The spindle sheave 108 is connected to the spindle 18 via a square key 109 fitted in the key way 109' on the distal end of the spindle 18 and via spindle bearing adjusting nut 116 and the spindle bearing lock ring 117.

The power drive motor 26 is mounted on the side of the mainframe assembly 12 and has a shaft 27 extending from the distal end of the power drive motor 26. The shaft 27 is aligned substantially parallel to the spindle 18 and a motor sheave 104 is mounted on the end of the shaft 27 via a set screw 105 and an internal retaining ring 106. A drive belt 23 extends between the motor sheave 104 and the spindle sheave 108 transmitting the power output of the motor 26 to the spindle 18. The structure the size of the sheaves 104 and 108 also reduce the speed of rotation of the spindle 18 as compared to the speed of rotation of the motor shaft 27.

A drive belt assembly cover 28 is provided to cover the spindle/belt assembly and protect the user of the machine from dangers incurred by this high speed pulley assembly. The cover 28 has a rectangular opening 110 on its proximal face and the rectangular opening 110 mates with the rectangular shape of the distal end of the mainframe 12 so that the cover 28 can be slid over the mainframe 12 in engagement with it. A screw or similar connector can be used to connect the cover 28 to the mainframe 12 to lock the cover in place.

The mainframe 12 is of a substantially rectangular configuration and has ears 135 at the base with holes through the ears 135 so that the mainframe 12 can be mounted via screws onto a work bench. Also, the mainframe includes lamp assembly Q which includes a flexible neck 118 so that the lamp may be positioned to provide adequate lighting for the user to properly inspect and control the turning of the wear surface of the drum or rotor. The light is conveniently provided with a switch 132 and a dust boot 133 which keeps waste material from getting into the lamp assembly Q.

Figure 5:
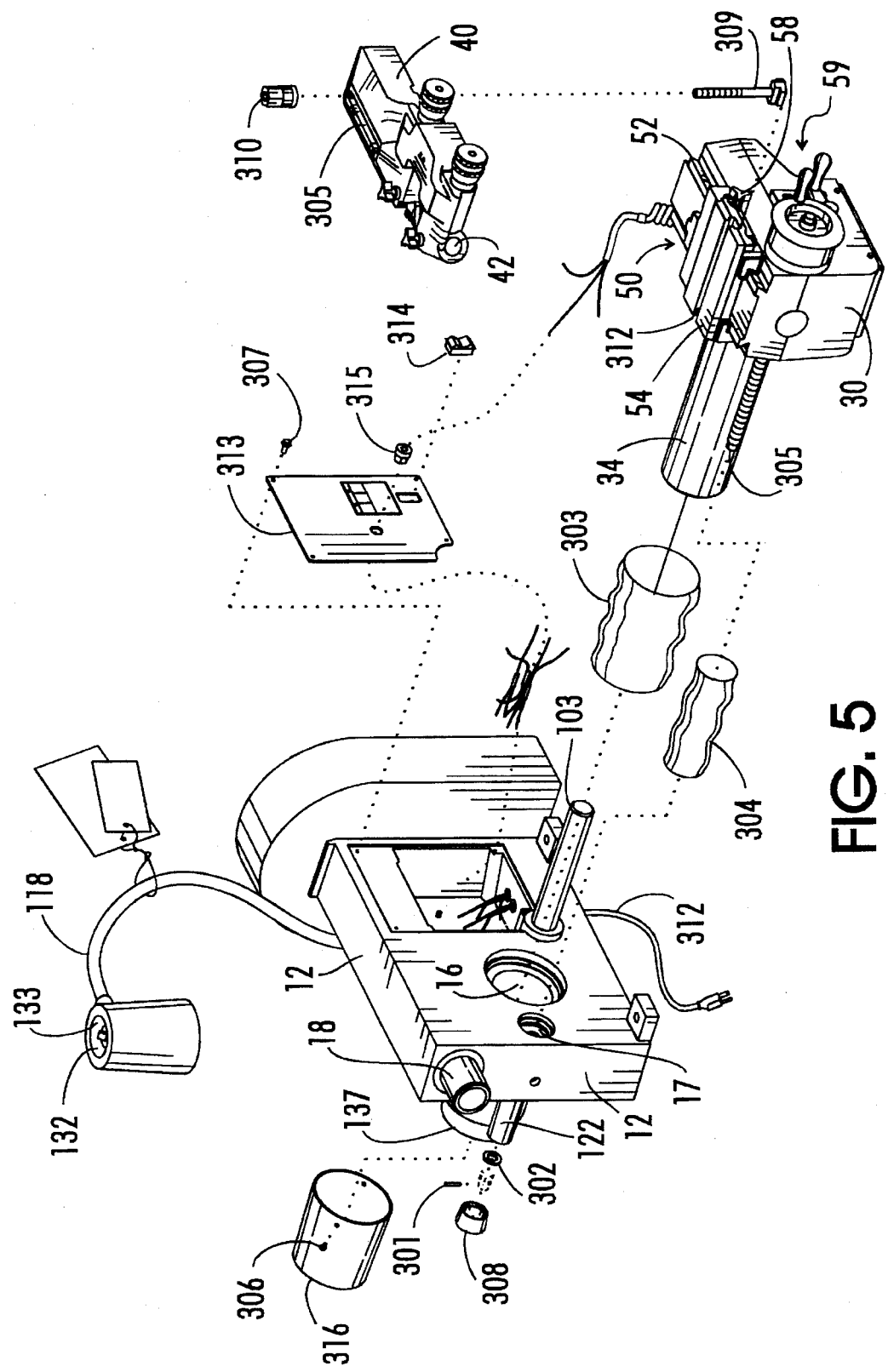
FIG. 5 shows in exploded perspective view the lathe assembly of the machine.

Turning now to FIG. 5, the mounting of the cross feed assembly 30 and the twin cutter assembly 40 on the mainframe is illustrated. Protruding perpendicularly from the cross feed assembly 30 is the cross feed journal 34. The cross feed journal 34 passes through the lateral opening 16 in the mainframe 12 and is slidably fitted within the opening 16. Guide bar 103 is mounted in a lateral opening 136 in the mainframe 12 and an opening (not shown in FIG. 5) is provided in the cross feed assembly 30 to receive the guide bar 103. Thus, the cross feed assembly 30 is slidably mounted on the mainframe 12 for movement laterally with respect thereto and the guide bar 103 stabilizes the cross feed assembly 30 and keeps it from rotating about the cross feed journal.

Also protruding from the back side of cross feed assembly 30 is the rotor feed lead screw 325 which passes through yet another lateral opening 17 in the mainframe 12. Because the opening 17 is threaded, when the rotor feed lead screw 325 is turned, the cross feed assembly will be driven laterally of the mainframe 12 either toward or away from the mainframe 12, depending upon the direction of rotation of the rotor feed lead screw 325. Washer 302 is connected to the distal end of rotor feed lead screw by pin 301 and functions as a mechanical stop to stall the slide drive motor and keep the lead screw from disengaging from its threaded opening 17. The cross feed assembly serves to stall the slide motor and keep the lead screw from disengaging when the rotor feed lead screw is turned in the opposite direction. The slide motor employed in this design is a "stall protected" motor, i.e., stalling the motor by imposing excess load on the output shaft will not cause the motor to burn itself out. (Motors of this type are generally available on the market, one such motor being manufactured by Merkle Korff Industries, Inc. of Des Plaines, Ill. 60018).

When the cross feed assembly 30 is moved away from the mainframe 12, the cross feed journal 34 is protected from debris and exposure to elements by the cross feed journal boot 303. Likewise, when the rotor feed lead screw 325 is exposed because the cross feed assembly 30 is removed from the mainframe 12, the lead screw boot 304 protects the rotor feed lead screw 325 from exposure to debris and the like.

When the cross feed assembly 30 moves toward the mainframe 12, such that the cross feed journal 30 and the rotor feed lead screw 325 extend through the openings 16 and 17 respectively, out the back side of the mainframe 12, they are protected by the cross feed journal protector tube 137 and the rotor feed lead screw protector tube 122 which are closed at their distal end by cross feed end cap 316 and rotor feed lead screw protector tube cap 308. The caps are joined to the protective tubes by screws 306 (connecting the cross feed journal protector tube to the cross feed end cap 316) or by friction fit (connecting the rotor feed lead screw cap 308 to the protector tube 122).

Referring again to FIG. 5, the machine 10 is shown to have electrical panel 313 which is connected via screws 307 to the mainframe 12. An electrical power supply is provided via the power cord 312 which is connected via a wiring harness to activate the machine through the operation of the switch 314. A strain relief plug 315 is provided for the wiring harness to pass through the mainframe 12 to connect to the cross feed assembly 30 in order to provide power to slide motor 410 (see FIG. 6.)

FIG. 5 also illustrates in greater detail the twin cutter assembly 40 and the structure by which it is mounted on the cross feed assembly 30 via the dove-tail mounting assembly 50. As previously indicated, the dove-tail mounting assembly 50 includes the dove-tail rail 52 extending in a longitudinal direction across the top of the cross feed assembly 30. Mounted on the dove-tail rail 52 is the slide 54 which has a channel on the underside thereof shaped to mate with the dove-tail rail 52 of the assembly 50. The mating relationship between the dove-tail rail 52 and the slide 54 allows a solid, stable mounting of the twin cutter assembly 40 on the cross feed assembly 30; however, when the twin cutter assembly is replaced by a boring bar assembly, the boring bar assembly is slidable along the rail 52 in a longitudinal direction of the machine 10 so that the machine will make an inline cut to finish the wear surface of a brake drum.

The twin cutter assembly 40 is mounted to the dove-tail mounting assembly 50 via the t-bolt 309, the square head of which fits in the groove 312 in the top of the slide 54 and extends through the opening 305 in the distal end of the twin cutter assembly 40. The self-aligning nut 310 can be tightened to hold the twin cutter assembly 40 in a fixed relationship relative to the dove-tail mounting assembly 50 yet allowing adjustments of the twin cutter assembly in a longitudinal direction. As previously indicated, the twin cutter is mounted on the cross feed assembly when the machine is configured for rotor resurfacing and the cross feed assembly moves in the lateral direction. The two cutters of the twin cutter are aligned on opposing faces of the rotor so that both wear surfaces of the rotor can be finished with one pass. When the machine is configured for longitudinal movement to finish the wear surface of a drum, the twin cutter assembly is removed by loosening the self-aligning nut 310, removing it from the T-bolt 309 and replacing the twin cutter with a boring bar assembly. The boring bar assembly is illustrated in detail in FIG. 12. The boring bar assembly has an opening 305' and a body which fits over and mates with the top shape of the dove tail mounting assembly 50 so that when the T-bolt 309 is passed through the opening 305', the self aligning nut 310 can be tightened to hold the boring bar assembly in place.

Figure 8:
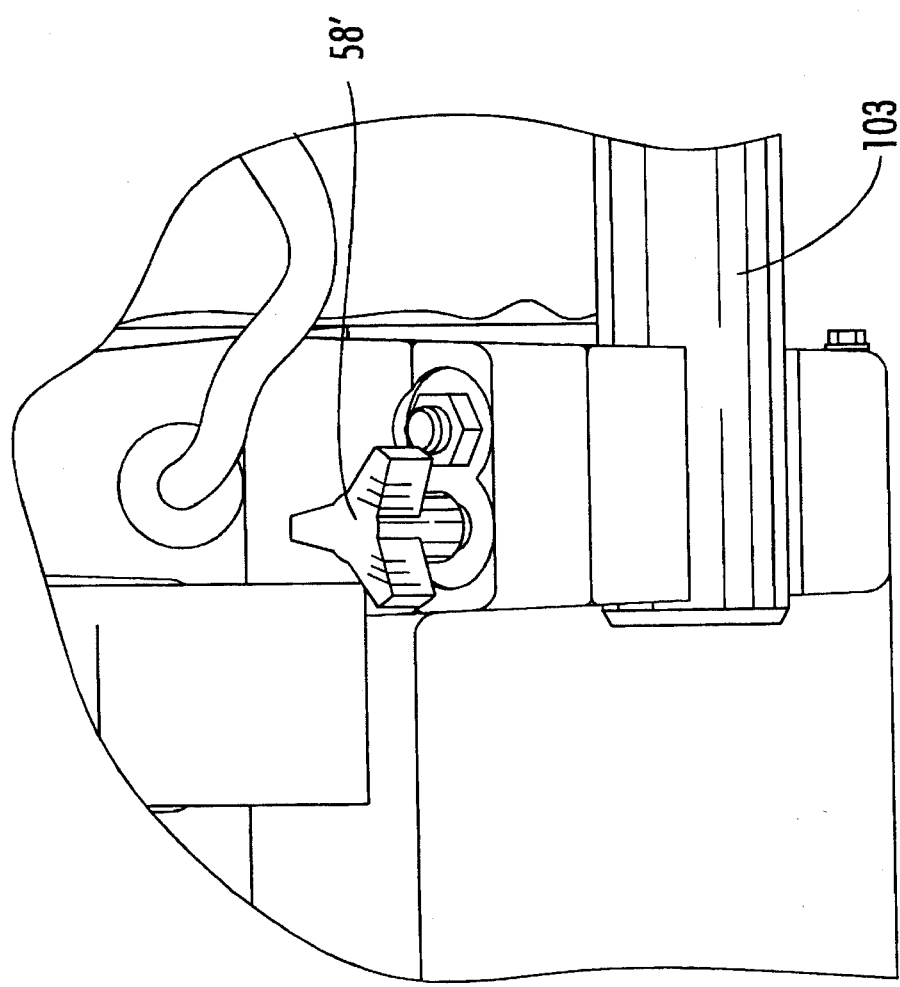
FIG. 8 shows a plane view of the clamping mechanism for the guide bar of the cross feed assembly which holds the cross feed assembly in place when the machine is configured for a drum cut.

Referring now to FIGS. 5 and 8, there is illustrated a pair of lock nuts 58 and 58' which are employed in setting the machine between rotor and drum cut configurations. The lock nut 58' is on the back side of the cross feed assembly 30 at approximately the location to which the arrow 59 is pointing. The lock nuts 58 and 58' function to secure the assembly in unidirectional movement, depending upon the configuration in which the machine is set. When the machine is set for a cross feed movement, in order to make a lateral cut to finish the wear surface of a rotor, the lock nut 58 is tightened to hold the dove-tail assembly in place relative to the cross feed assembly 30 and the lock nut 58' is loosened to allow the cross feed assembly to slide along the guide bar 103. Conversely, when the machine is configured for an in-line movement, in order to finish the wear surface of a brake drum, the lock nut 58 is loosened so that the dove-tail mounting assembly 50 can move along the dove-tail track 52 and the lock nut 58' is tightened to clamp cross feed assembly to the guide bar 103 so that the only movement of the machine will be in an in-line direction for finishing the wear surface of the brake drum.

Figure 7:
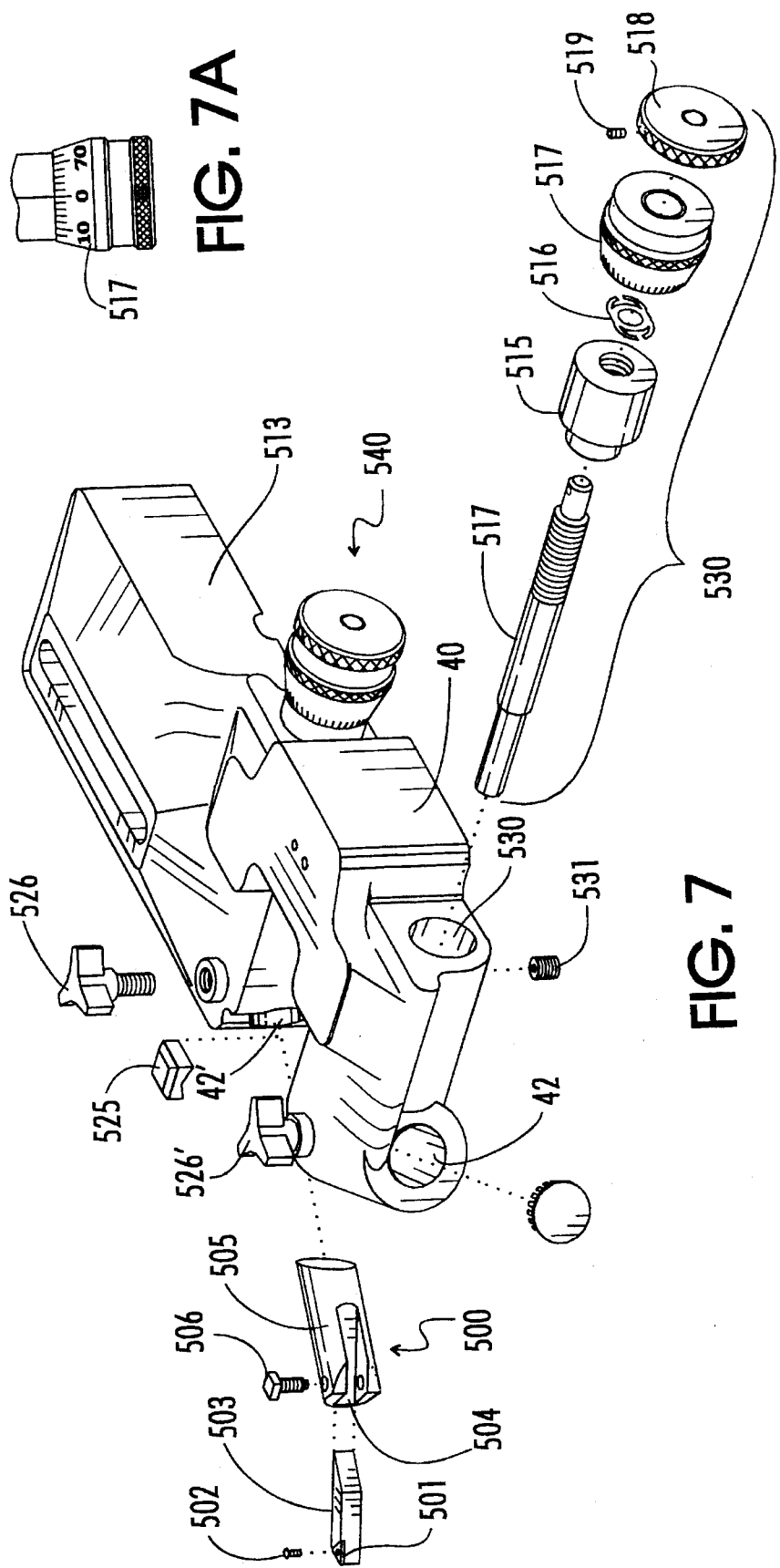
FIG. 7 shows in exploded perspective view the twin cutter of the machine.

FIG. 7 illustrates in detail the twin cutter of the lathe along with the cutting bit itself. The twin cutter 40 is mounted on the dove tail mounting assembly 50 as has been previously described. The twin cutter 40 includes housing 513 and dual micrometer adjustment assemblies 530 and 540. Each of the two micrometer adjustment assemblies includes a dial rod 514, a dial plug 515, a spring washer 516, a micrometer dial 517, a dial rod knob 518, and a set screw 519. The dial rod 514 passes through openings 530 extending laterally of the twin cutter. The dial rod 514 is fixed in place by set screw 531 passing through the bottom of the twin cutter.

FIG. 7a illustrates the micrometer dial 517 in greater detail. The dial is adjusted to zero when the cutting tool is placed in touching proximity to the surface of the rotor or drum to be polished. The micrometer is then turned in accordance with the gauge to establish the depth of cut of the cutting tool. The twin cutter assembly adjustment structure has been in use for many years and its structure and use is well known in the industry and does not require further description for those skilled in the art.

The twin cutter includes a port 42 and a second port 42' for carrying the tool bit holder of the lathe. The port 42 receives the left tool bit holder and the port 42' receives the right tool bit holder. The opposing tool bits finish the opposing wear surfaces of a brake rotor as has been previously described.

The tool holder itself is illustrated generally by reference character 500. The structure includes a tool bit shank 503 which fits within slot 504 formed in tool holder 505. The slot 504 in the tool holder 505 is cut at an angle and is of a shape to mate with the shape of the tool bit shank 503. Thus, the tool bit shank 503 can fit within the tool holder 505 and be fixedly secured in the tool holder by the screw 506. The carbide tool bit insert 501 mates with and fits in a slice taken from the outer edge of the tool bit shank 503. The tool bit carbide insert 501 is attached to tool bit shank 503 by screw 502.

The tool holders can be inserted into the ports 42 and 42' and clamped into place by the a tool holder gib 525 which is held in place by a lock knob 526 (for the right tool holder) and lock knob 526' (for the left tool holder).

The boring bar assembly is the alternative cutting tool to the twin cutter assembly. As can be seen from FIG. 12, the boring bar assembly 550 includes the boring bar 554 held within the boring bar assembly between its base 556 and cover 558. The end 552 of the bar includes a slot 504' for mounting the tool bit shank 503 to preform the in line cut for finishing the wear surface of a brake drum.

Figure 6:
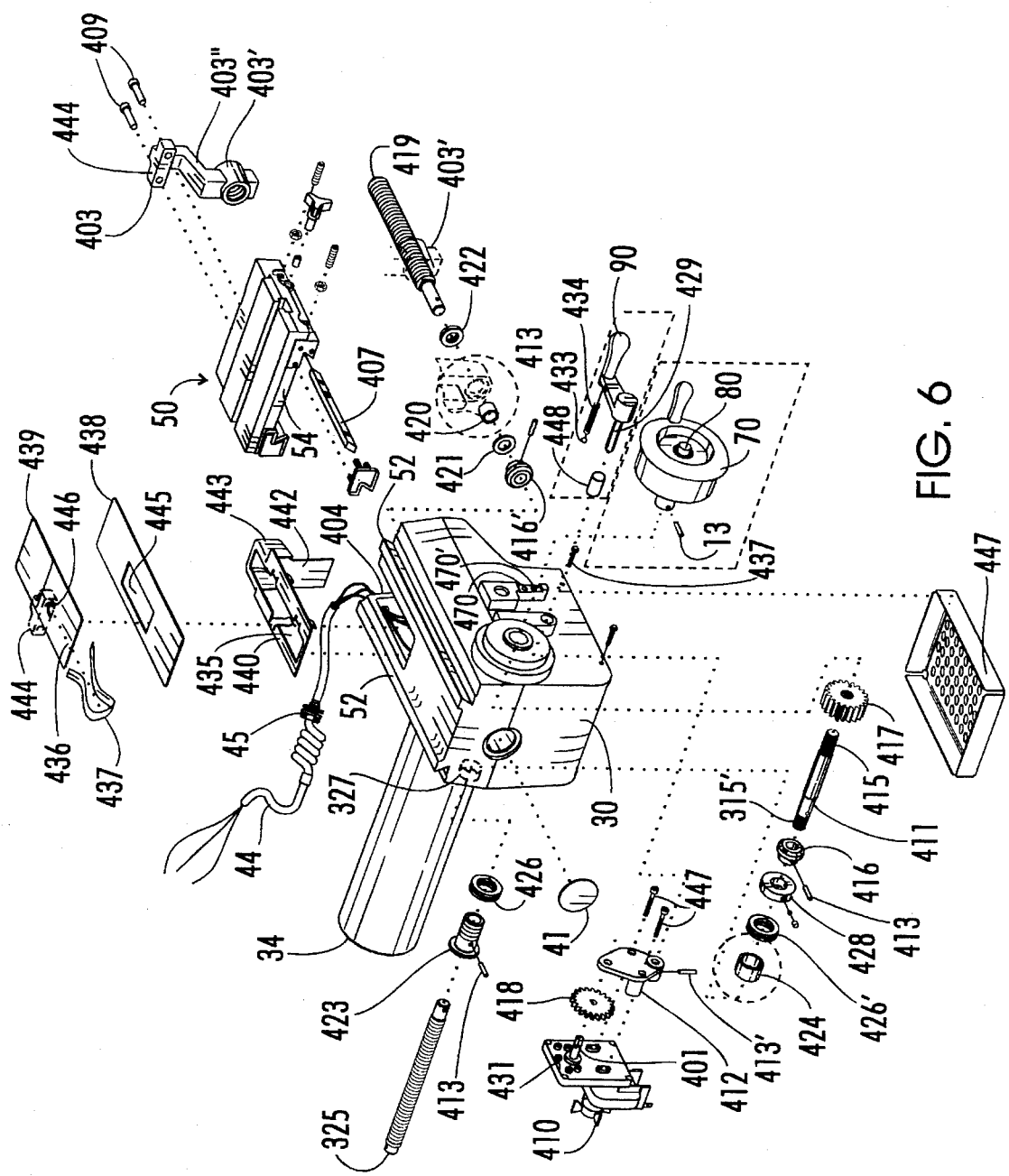
FIG. 6 shows in exploded perspective view the cross-feed assembly of the machine.

Referring now to FIG. 6, the details of the feed assembly for the lathe are illustrated in greater detail. As previously indicated, the cross feed assembly 30 has a cross feed journal 34 protruding perpendicular from the backside thereof with the journal passing through the lateral opening 16. The cross feed journal 34 can move toward and away from the mainframe 12 by movement of the cross feed journal 34 within the lateral opening 16.

The movement of the cross feed assembly 30 is controlled by the rotor feed lead screw 325. The rotor feed lead screw 325 is connected to the coupler assembly 323 via the drive lock groove pin 413 which in turn fits within the thrust race/bearing assembly 426 fitted within the opening 427 in the body of the cross feed assembly 30. The rotation of the rotor feed lead screw 325 is as a result of the power train transmitting the power of the slide motor 410 to the lead screws of the cross feed assembly. Located in line with the rotor feed lead screw 325 is drive shaft 411 which has a spline 415 at one end and a spline 415' at the other. Mounted on the spline 415 is a driven gear 417 with a relatively wide gear-toothed face. The end of the drive shaft 411 having the spline 415 is considered the power input side of the drive shaft and the end having the spline 415' is the power output side of the drive shaft 411. Mounted intermediate the two ends of the drive shaft 411 and adjacent the spline 415' is beveled drive gear 416. The slide motor 410 is mounted on the cross feed assembly 30 and is connected via a gear assembly to an output shaft 401 on which is mounted drive gear 418.

The mounting of the slide motor 410 is via screws 447 which connect the slide motor mounting bracket 412 to the slide motor 410. The slide motor is connected through a small gear reduction assembly housed within housing 431 to its output shaft 401. The connection of the slide motor assembly to the cross feed assembly 30 is via the pivot shaft 429 extending from feed engagement lever 90. The pivot shaft 429 is fixedly connected to the bracket 412 via a pin 413' thus, when the feed engagement lever 90 is rotated about the pivot shaft 429, it will cause an arcuate movement of the slide motor 410 which in turn causes an arcuate movement of the output shaft 401 of the slide motor 410. The arcuate movement of the output shaft 401 thus causes the drive gear 418 to move into and out of engagement with the driven gear 417 depending upon the position of the feed engagement lever 90. By the foregoing mechanism, the slide motor 410 can be continuously operated and the transmission of power to the multiple feed assemblies of the machine 10 can be controlled by engagement and disengagement between the drive gear 418 and the driven gear 417 through movement of the feed engagement lever 90 between a disengaged position (clockwise rotation in the configuration of the lathe as illustrated) and the engaged position (counter-clockwise rotation of the feed engagement lever 90 in the configuration as illustrated).

When the feed engagement lever 90 is rotated in a counter-clockwise direction to rotate the drive gear 418 into engagement with the driven gear 417, power is transmitted through the drive shaft 411 to drive either the rotor feed lead screw 425 or the drum feed lead screw 419 depending upon the configuration of the system. As can be seen from the illustration in FIG. 6, the tooth-face of the drive gear 418 is relatively narrow as compared to the wide-tooth face of the driven gear 417. The mounting of the drive shaft 411 is such that the drive shaft 411 can be shifted slightly toward or away from the mainframe 12, but in either position, the drive gear 418 will remain in engagement with the driven gear 417. However, when the drive shaft 411 is toward the mainframe 12, the beveled drive gear 416 disengages from the beveled driven gear 416' and the spline 415' engages a female spline in the coupler assembly 423. When the spline 415' connects with the female spline within the coupler assembly 423, the rotor feed lead screw 425 is rotated within the thrust race/bearing assemblies 426. The rotor feed lead screw 425 passes through the opening 17 of the mainframe 12 and mates with threads formed either directly or within a raceway or bushing mounted within the opening 17. Thus, as the cross feed lead screw 325 turns, it will draw the cross feed assembly toward the mainframe 12 or push it away from the mainframe 12 depending upon the direction of rotation. This movement of the cross feed assembly control the lateral movement of the twin cutter to finish the wear surface of a brake rotor.

When the drive shaft 411 is moved laterally away from the mainframe 12, the spline 415' disengages the female spline in the coupling 423, while at the same time, the beveled drive gear 416 engages the beveled driven gear 416' mounted on the forward most end of the drum feed lead screw 419. Thus, if the slide motor is engaged to turn the drive shaft 411, the beveled drive gear 416 rotates the drum feed lead screw 419. As FIG. 6 illustrates, the remote end of the drum feed lead screw 419 passes through a threaded opening in the base 403' of the drum feed guide arm 403 causing the drum feed guide arm 403 to move toward or away from the cross feed assembly 30 in a lineal direction relative to the mainframe 12, depending upon the direction of rotation of the drum feed lead screw 419. The drum feed guide arm 403 is connected via screws 409 to the dove tail mounting assembly 50 so as the drum feed guide arm 403 moves in a lineal direction relative to the cross feed assembly 30, so must the dove tail mounting assembly 50.

FIG. 6, along with FIGS. 14–18, illustrate in detail the enhanced chip guard assembly of the present invention. Since the drum feed guide arm 403 moves linearly of the machine, there is a gap 404 in the top of the cross feed assembly 30 and the drum feed guide arm moves into and out of that gap as it performs its intended function. To keep debris from falling within the opening created by the gap 404, Applicant' have designed the chip guard assembly of this invention. The assembly includes the clip 440 which clips within the opening of the gap 404. The clip 440 includes an elongated opening 435 with depending clip legs 436 integral with the clip and protruding from the perimeter of the elongated opening 435. The clip legs 436 have elbows 441 which grip beneath the edges of the housing of the cross feed assembly 30 about the perimeter of the opening of the gap 404 to hold the clip in place. The drum feed guide arm 403 fits within the elongated opening 435 in the clip 440. The clip 440 also has a depending skin 442 which serves to cover and protect the cross feed assembly from debris falling into the opening in the back of the assembly. Bulb 443 is formed integrally with the clip 440 at the back of the clip. The Bulb 443 serves as a housing at the rear of the cross feed assembly to accommodate the rearward most movement of the base 403' of the drum feed guide arm 403. Thus, the shank 403" of the drum feed guide arm 403 is the portion of the drum feed guide arm that passes through the elongated opening 435, leaving the head 444 of the drum feed guide arm exposed outside the protection of the enhanced chip guard assembly.

The slide 438 fits over the clip 440 and within the track formed by the rails 52 of the cross feed assembly 30 and is slidably engaged therein. The slide 438 also has an opening 445 through which the shank 403" passes and is slidably positioned. Likewise, the follower 439 has an opening 446 through which the shank 403" passes to expose the head 444 of the drum feed guide arm 403. The follower 439 is made of rubber or other flexible material and has a slit 436 extending to its perimeter so that the follower can be fitted over the shank 403". A piece of tape 437 is fitted over the slit to close it once the follower is in place over the shank of the drum feed guide arm. Thus, the follower seals about the shank because the opening 446 is shaped to mate with the cross sectional shape of the shank 403" to prevent chips and other debris from getting inside the machine. The follower moves with the drum feed guide arm and slides over and covers the opening 445 of the slide 438, which in turn slides over and covers the elongated opening 435 of the clip 440. Because each of the pieces of the enhanced chip guard assembly have a flat mating surface and the slide and follower are basically flat, planer elements, the pieces work together to close and protect the gap 404 within the cross feed assembly of the lathe. FIG. 6 also illustrates additional parts associated with the assembly of the cross feed structure and which would be readily determinable by one skilled in this art. For example, the rotor feed lead screw passes through the bushing 424 and is mounted via a second thrust race/beating assembly 426'. Beating collar 428 is provided for mounting the thrust race/bearing 426. A bottom cross feed cover 447 is mounted via four self-tapping screws 437. Also, the pivot shaft 429 is mounted in a bushing 448 and the ball 433 and spring 434 serve to hold the lead engagement lever 90 in place once the lever is rotated through either the engaged or disengaged position. Other mechanical aspects of the mounting include the thrust race 421 and bearings 422 for mounting the drum feed lead screw 419; bushing 420 is provided for the proper mounting of the drum feed lead screw 419; and jib 407 which is provided inside the open face of the slide 54 so that when the assembly wears, the jib may be replaced without having to replace the entire assembly.

Figure 9:
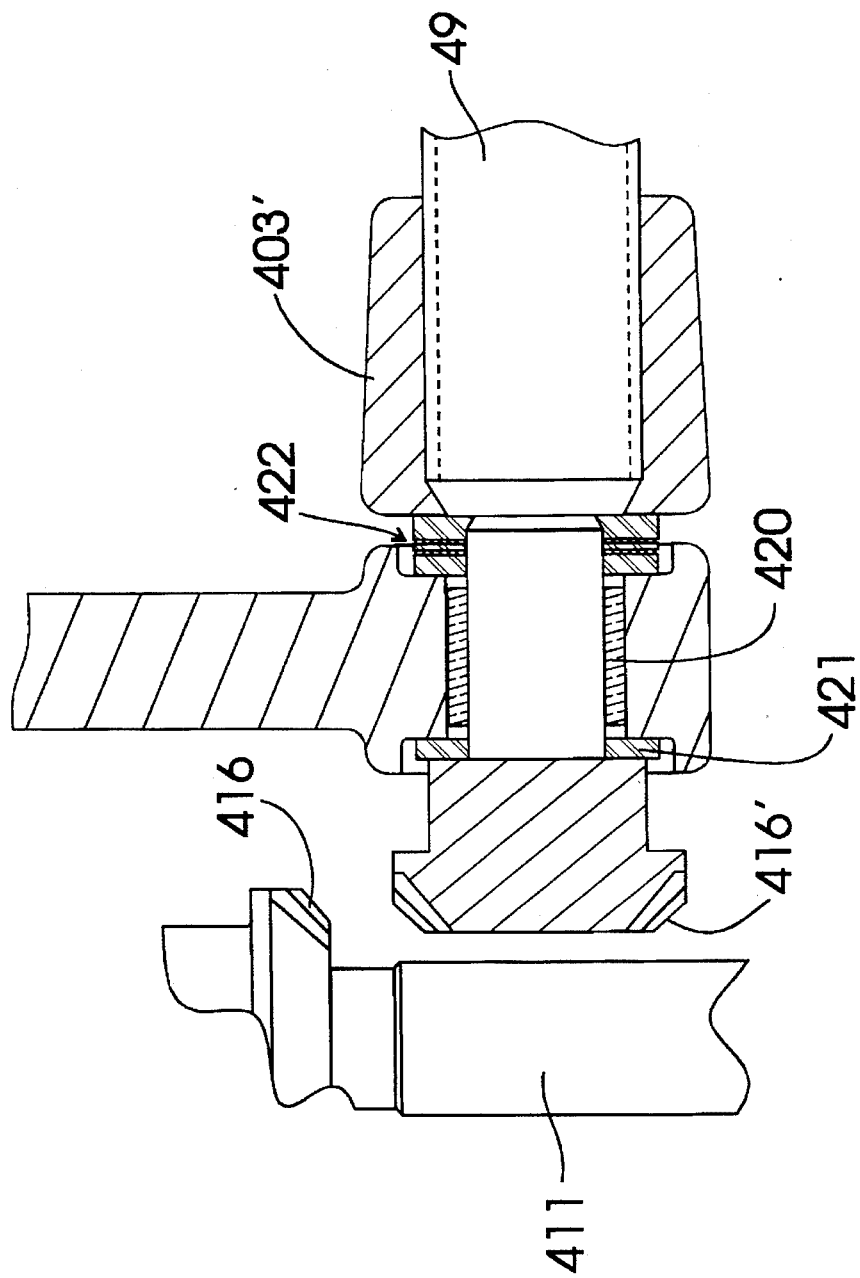
FIG. 9 shows in plane view, partially cut away, the drive train mechanism of the machine.
Figure 10:
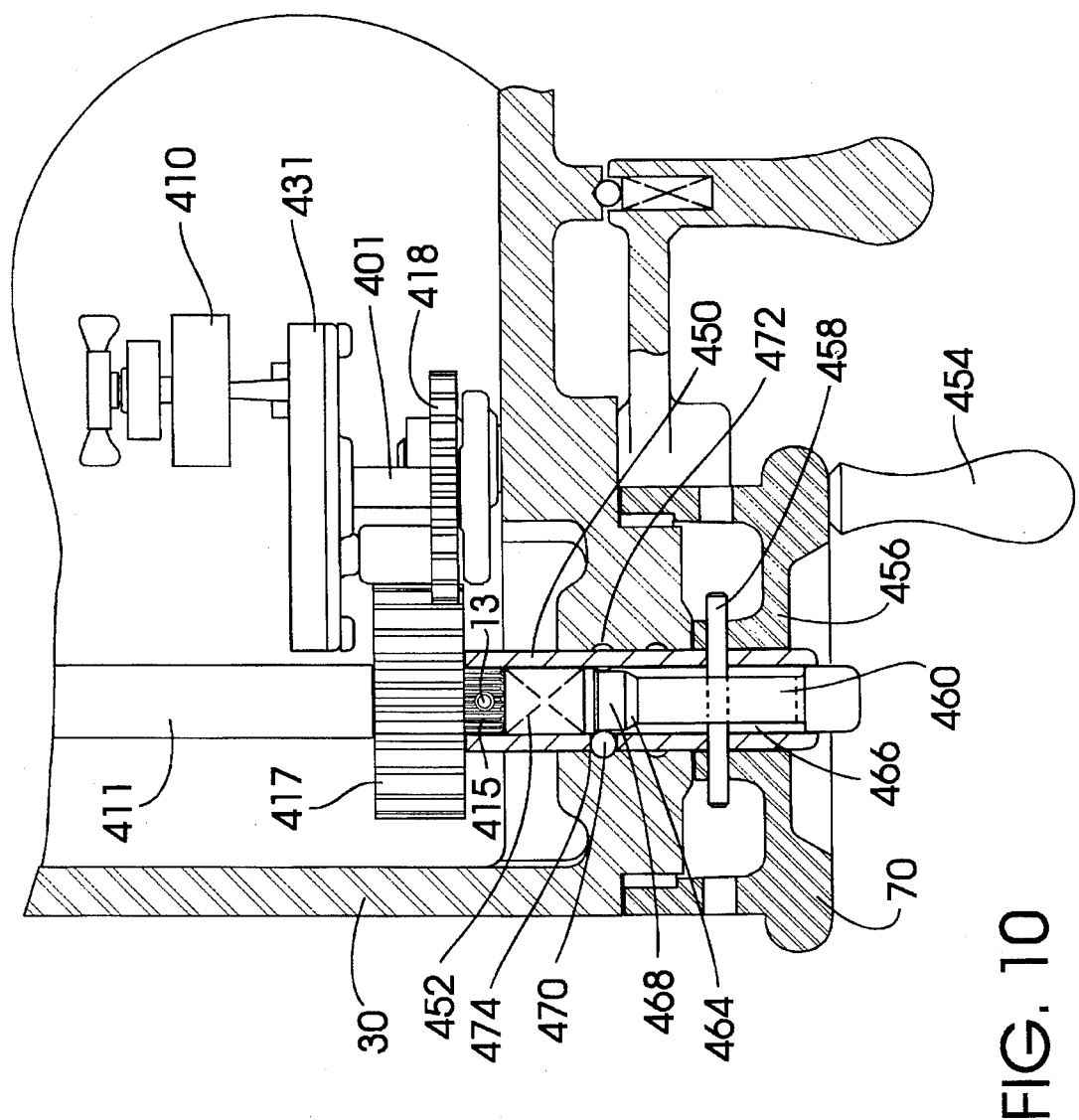
FIG. 10 shows in plane view, partially cut away, the machine configured for a lateral cut.
Figure 11:
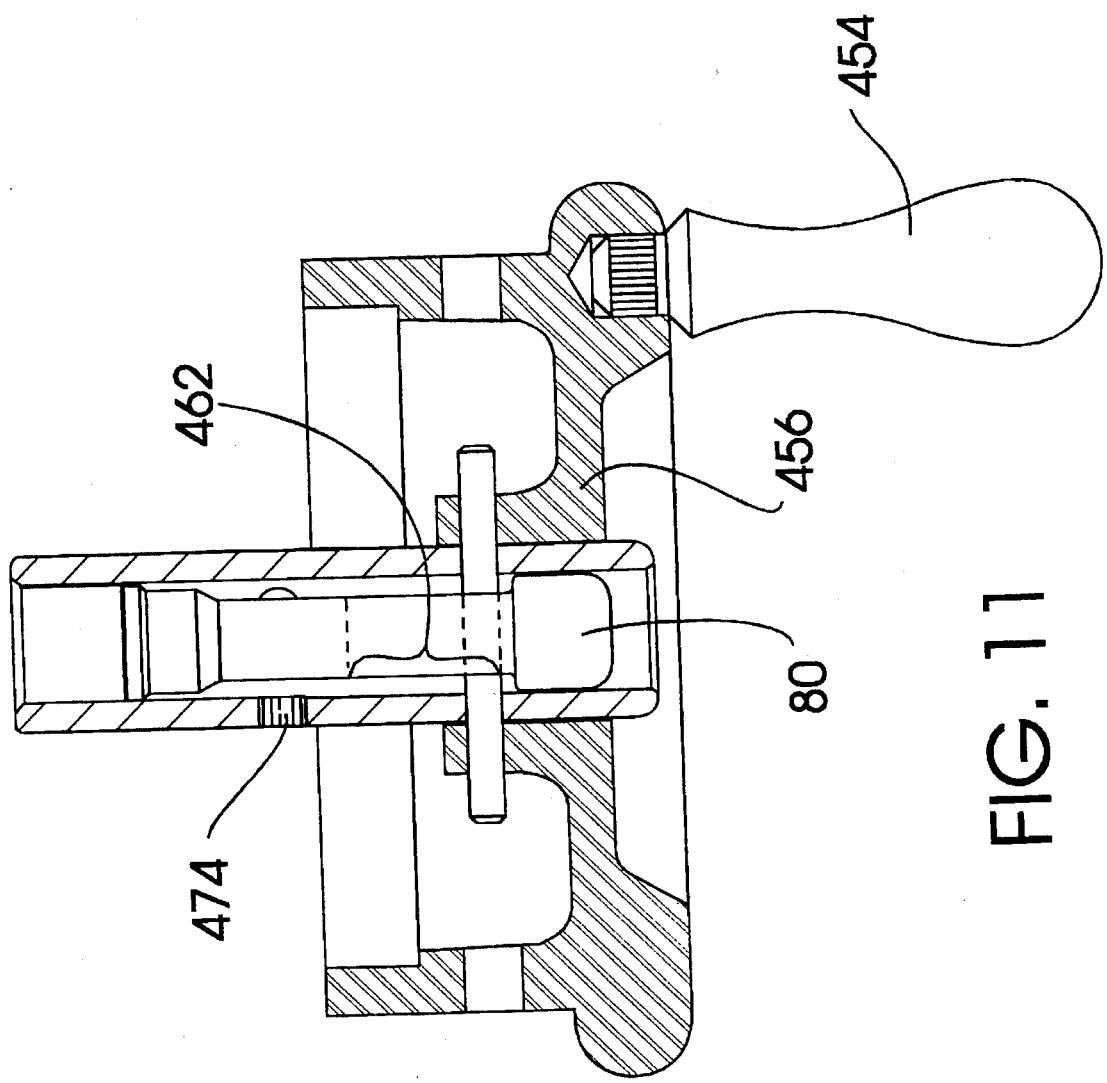
FIG. 11 shows in plane view, partially cut away, the hand wheel sub assembly of the machine.

Referring now to FIGS. 9, 10 and 11, the clutch assembly for engaging and disengaging the multiple lead screws of the machine is illustrate in more detail. In addition to enabling the configuration of the machine to be shifted between an in-line feed and a lateral feed, the structure enables manual adjustment prior to commencing the turning of a rotor or drum. The features illustrated in FIGS. 9, 10 and 11 show greater detail of the structure illustrated generally in FIG. 6.

Looking at FIG. 9, the drive shaft 411 is positioned so that the spline 315' is engaged within the spline mating surface inside the coupling 423 to drive the rotor feed lead screw 325, and the beveled gears 416 are disengaged. For the configuration shown in FIG. 9, the button 80 is in the released position as illustrated in FIG. 10. When the button 80 extends outwardly from the hand wheel as shown in FIG. 10 and the hand wheel is pushed in toward the machine, the drive shaft 411 is in the position shown in FIGS. 9 and 10 to engage the spline 315' with the coupling of 423 and disengage from the beveled gears. This configuration also enables the operator to manually adjust the position of the twin cutter in order to locate it properly about a drum rotor prior to starting the cutting process for finishing a rotor. That same position of the hand wheel assembly 70 enables the operator to set the depth of cut for the machine when it is configured to finish the wear surface of a brake drum.

To reconfigure the machine to finish a brake drum, the button 80 is depressed and the hand wheel assembly 70 is pulled laterally outwardly toward the operator to disengage the spline 315' from the coupling 423 and causing the beveled gears 416, 416' to engage. In this position, manual rotation of the hand wheel 70 will adjust the position of the machine in the in-line direction to enable the operator to adjust the location of the boring bar assembly relative to the wear surface of a brake drum.

Looking now specifically at FIGS. 10 and 11, the structure for switching between hand adjustment for in-line feed and lateral feed is shown in greater detail. Specifically, as can be seen from FIG. 10, the assembly includes a hand wheel tube 450 which has a compression spring 452 contained within the tube. The push button 80 is also located within the hand wheel tube 450 and has a base 468 which captures the compression spring 452 between the base 468 and the end of the drive shaft 411. The compression spring causes pressure against the face of the base 468 to push it away from the drive shaft 411 when the system is in its normal, at rest position. The system illustrates a crank handle 454 which is rotatably mounted within the hand wheel 456 so that the crank can be turned and rotates about its connection to the hand wheel 456 to create adjustments in the position of the machine as will be described.

The push button 80 includes a shank 460 extending between head of the push button protruding from the hand wheel 456 and its base 468. The shank 460 has a shoulder 464 which reduces the diameter of the shank to create a recess 466 within the hand wheel tube 450. A pin 458 passes through diametrically opposed holes in the hand wheel 456, which are in registry with similar diametrically opposed holes in the hand wheel tube 450, and through a slot 462 in shank 460. The slot 462 (see FIG. 11) allows the button 80 to move axially in and out of the hand wheel tube 450 a short distance in order to permit the machine to be changed from one configuration.

When the machine is set in either of its two configurations, the push button 80 is forced away from the drive shaft 411 by comprising spring 452 and the button protrudes slightly out of the hand wheel tube 450. At this point, the ball 470 extends through a hole 474 in the hand wheel tube 450 and into a notch 472 in the housing of the cross feed assembly 30 to hold the machine in the selected configuration.

FIG. 10 also illustrates the connection via pin 13 between the hand wheel tube 450 and the spline 415 on the end of the drive shaft 411. The gear 417 is, of course, fixedly mounted to the drive shaft 411 so that force applied to the driven gear 417 via the drive gear 418 will turn the drive shaft 411. Thus, when the machine is configured as shown in FIG. 10, the crank handle 454 can be turned manually by the operator, thereby rotating the hand wheel 456 which, through the connection just described, will manually rotate the drive shaft 411. The drive shaft 411 being engaged via spline 315' to the coupling 423, the lead screw 325 will rotate to position the cross feed assembly in its lateral position in order to either set the depth of cut or the machine if it is configured to finish the wear surface of a brake drum or, alternatively, to locate the cutters in proper position to finish the wear surface of a brake rotor.

Turning now to the configuration shown in FIG. 11, when the button 80 is pushed inwardly from the hand wheel 450, the compression spring 452 is compressed and the shank 460 slides along the pin 458 with the pin 458 moving in the slot 462 of the shank to place the recess 466 in position to receive the ball 470 fitted within the hole 474 in the hand wheel 450. Because of the smooth, limited depth notch 472 formed in the housing of the cross feed assembly 30, the ball 470 will slip out of the notch 472 into the recess 466 and disengage the notch 472 upon manual pressure being applied on the hand wheel 456 to pull it outwardly from the machine, laterally away from the mainframe 12. When the hand wheel 456 is pulled laterally outwardly of the machine away from the mainframe 12, the ball is carried within the recess 466 and the hole 494 in the hand wheel tube 450 axially outwardly of the machine away from the mainframe 12. The ball cannot move completely out of the hole 494 because of the depth of the recess 466, but it can move sufficiently to disengage the notch 472 so it can move with the hand wheel tube 450 as it is pulled outwardly because of its connection to the hand wheel 456 via pin 458. Once the ball is moved approximately ½", it will engage a second notch 472' as the hand wheel tube 450 is moved outwardly, the push button 80 can be released so that the compression spring 452 causes the push button to once again be forced axially outwardly of the hand wheel tube 450. The pressure of the spring is also causing pressure to be applied against the ball 470 by the shoulder 464 so that as soon as the ball 470 is exposed to the notch 472', it will be forced outwardly by the pressure of the shoulder 464 into the notch 472'. At this point, the drive gear 411 has been moved approximately ½" laterally of the mainframe to disengage the spline 315' from the coupling 423 and to engage the drive beveled gear 416 with the driven beveled gear 416'. In this configuration, the hand wheel 456 can be turned manually to adjust the in-line position of the cutter so as to properly locate the cutter adjacent the wear surface of the drum in order to start the process of turning the drum through the operation of the machine.

Figure 13:
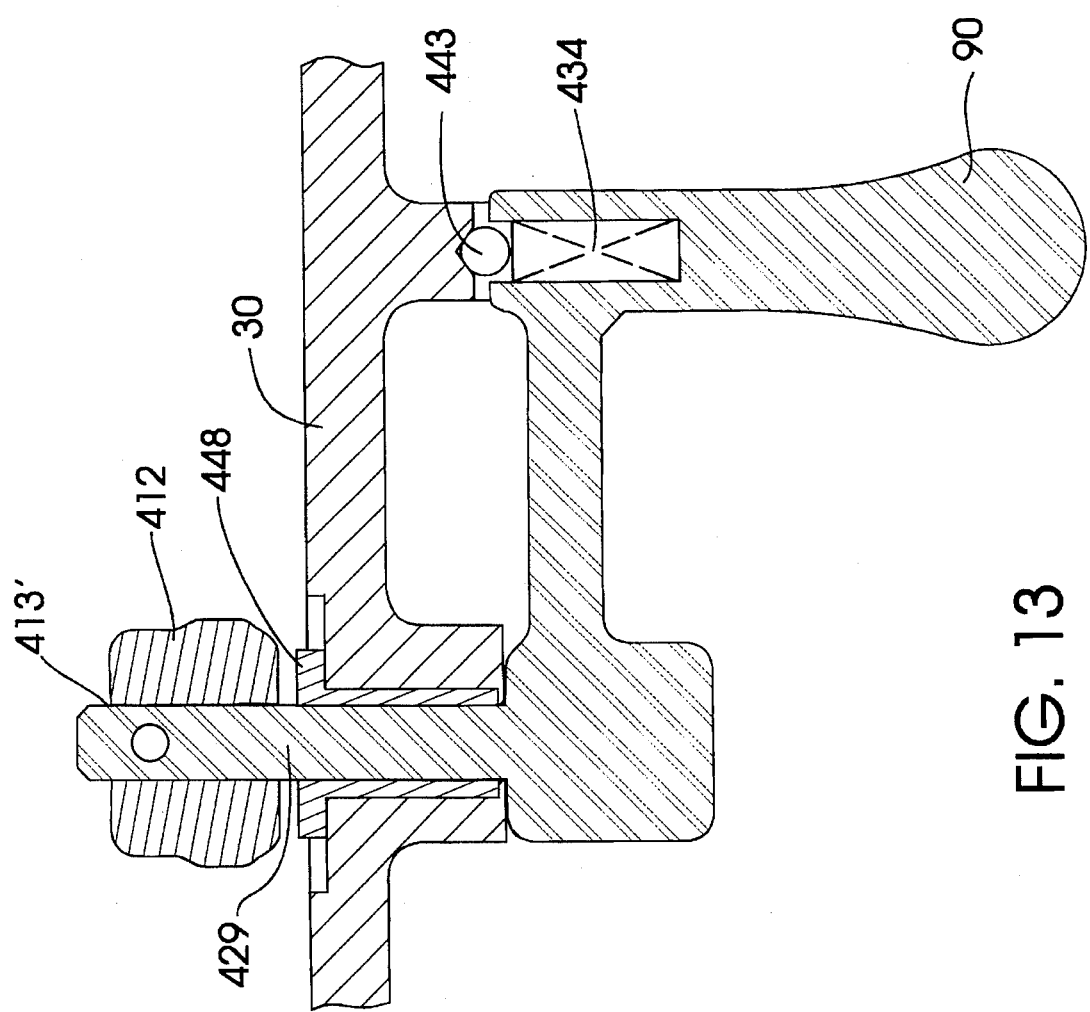
FIG. 13 shows in cross section the engagement lever for the machine.

Referring now to FIG. 13, the feed engagement lever is illustrated in more detail. This Figure should be reviewed in conjunction with FIG. 6 which also shows details of the feed engagement lever mechanism. The feed engagement lever 90 is fixedly connected to the pivot shaft 429 and rotates about that shaft which passes through the housing of the cross feed assembly 30. FIG. 6 and 13 also show the connection between the slid motor mounting bracket 412 and the pivot shaft 429 via the pin 413'. The spring 434 is fitted within an opening in the handle of the feed engagement lever 90 and presses against the ball 433 to tend to force the ball outwardly of the opening in the handle so that it will fit within either the detent 470 (when the slide motor drive gear 418 is engaged with the driven gear 417) and the detent 470' (when the feed engagement lever 90 is rotated in a clockwise direction to disengage the slide motor drive gear 418 from the driven gear 417).

Although there have been described particular embodiments of the present invention of a new and useful Slide Drive Mechanism and Cross Feed Assembly for a Brake Lathe, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A chip guard for an industrial machine producing or exposed to debris such as a brake lathe, said machine having a housing and internal working parts within said housing, a gap in such housing exposing the internal working parts to infiltration of debris, said gap having a perimeter, a working part extending from inside the housing protruding through the gap, said working part traversing the gap during operation of the machine, said chip guard including:

a. a clip having a body of a size and shape to cover the gap in the housing of the machine,
   b. an elongated opening in the body of said clip,
   c. said elongated opening being generally the shape of the path of movement of the moving part protruding through the gap of the machine,
   d. legs depending from the body of the clip,
   e. said legs shaped to mate with and snap onto the perimeter of the gap formed in the housing and hold the body of said clip in position to cover the opening in the housing of the machine formed by the gap;
   f. a follower made of a flexible material and shaped and arranged to mate with and slide over the body of said clip,
   g. said follower having an outer perimeter defining its shape,
   h. said follower having an opening within its perimeter and a slit between said opening and said perimeter,
   i. the opening in said follower shaped to mate with and fit about the portion of the moving part protruding through the gap of the machine, and
   j. means on said machine guiding said follower to cause said follower to follow the path of movement of the moving part protruding through the gap of the machine whereby said follower covers said gap and said elongated opening in said clip during said movement to prevent debris from infiltrating internally of said housing.

2. The device claimed in claim 1 further including a slide positioned between said clip and said follower, said slide having an opening through which said working part can pass and being shaped and positioned to cover said gap and said elongated opening.

3. The device claimed in claim 1 wherein said legs have elbows and are spring biased to generated pressure against the perimeter of said gap to hold said clip in place.

4. The device claimed in claim 1 further including means to seal said slit after the portion of the moving part protruding through the gap of the machine has been fitted within the opening of said follower.

5. The device claimed in claim 2 further including means on said clip to guide said slide for movement along a desired part as said slide moves with the movement of the moving part protruding through the gap of the machine.

* * * * *